May 28, 1946.
J. P. JOHNSON
2,401,078
CARRIAGE CHUCK AND BORING BAR
Filed Aug. 4, 1943
3 Sheets-Sheet 1
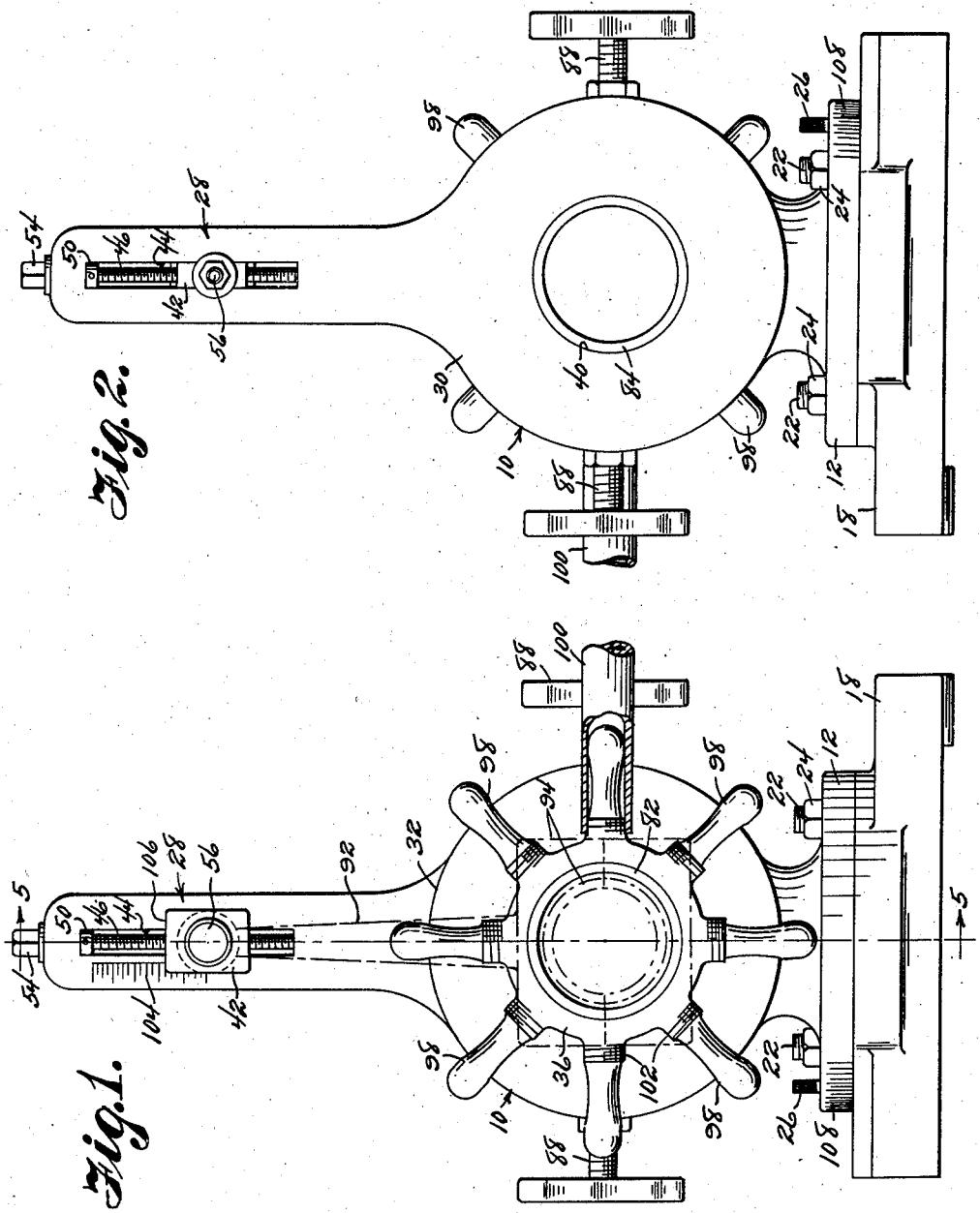
Junius P. Johnson INVENTOR.
BY
*Victor J. Evans & Co.*
ATTORNEYS

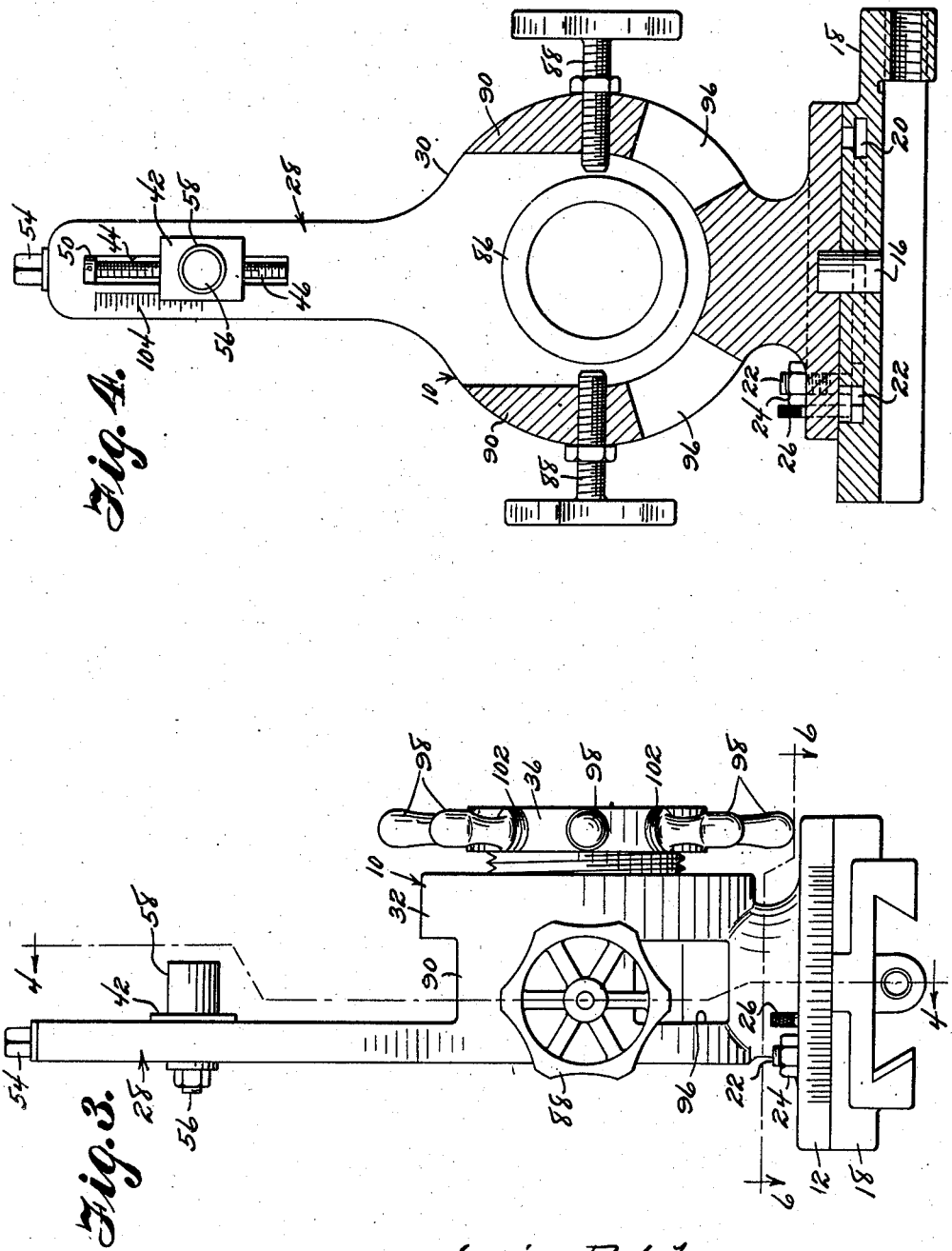

May 28, 1946.　　　J. P. JOHNSON　　　2,401,078
CARRIAGE CHUCK AND BORING BAR
Filed Aug. 4, 1943　　　3 Sheets-Sheet 3
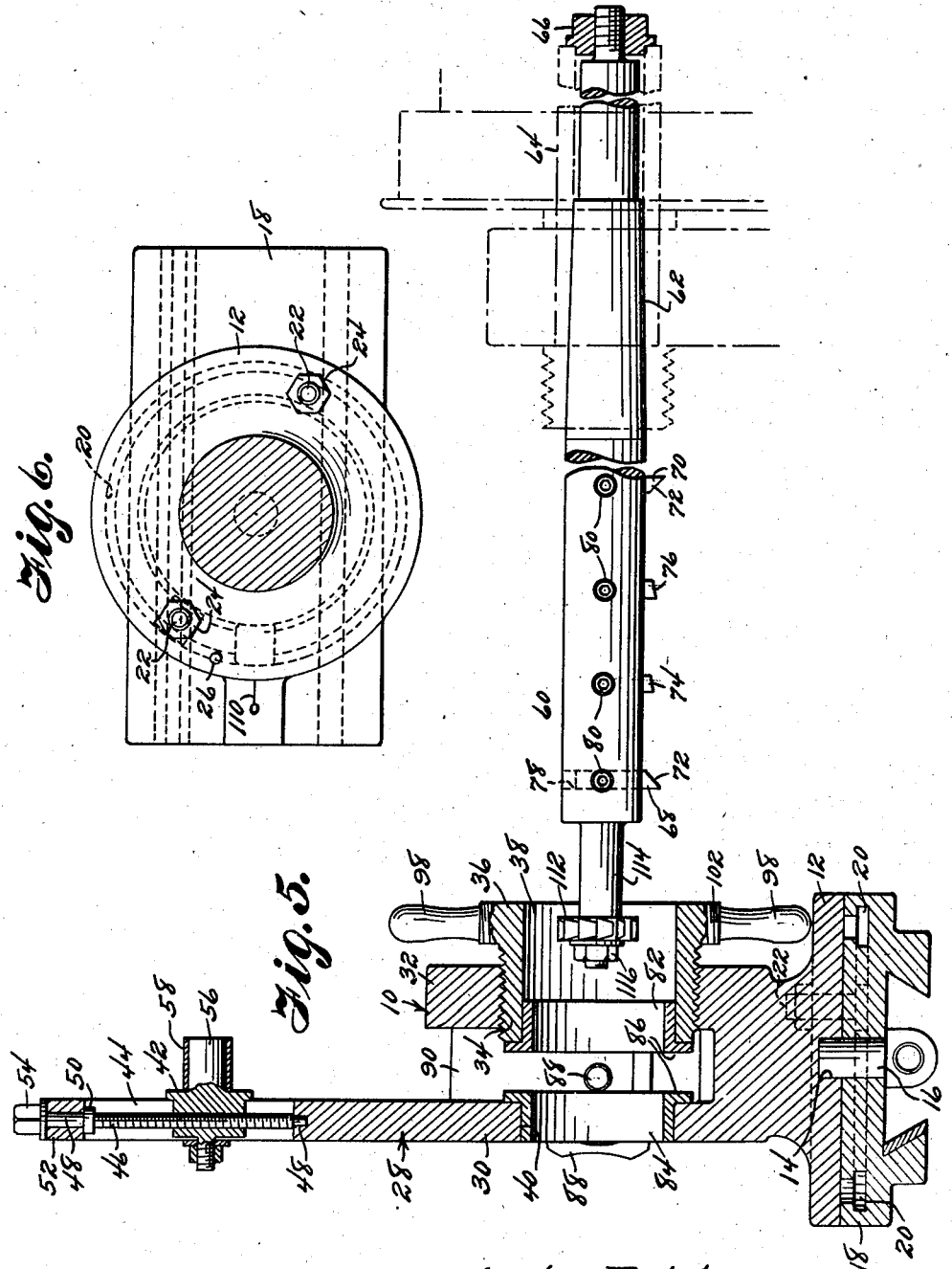
Junius P. Johnson INVENTOR.
BY
Victor J. Evans & Co.
ATTORNEYS Patented May 28, 1946

2,401,078

UNITED STATES PATENT OFFICE 2,401,078

CARRIAGE CHUCK AND BORING BAR

Junius P. Johnson, New Bern, N. C.

Application August 4, 1943, Serial No. 497,357

2 Claims. (Cl. 90—59)

My invention relates to the reconstruction of connecting rods such as are used in internal combustion engines, and has among its objects and advantages the provision of an improved carriage chuck and boring bar designed for coaction with conventional lathes, with the construction such as to facilitate counterboring and milling of the bearing.

In the accompanying drawings:

Figure 1 is an end view of my invention.

Figure 2 is a view of the opposite end.

Figure 3 is a side view.

Figure 4 is a sectional view taken along the line 4—4 of Figure 3.

Figure 5 is a sectional view taken along the line 5—5 of Figure 1, and

Figure 6 is a sectional view taken along the line 6—6 of Figure 3.

In the embodiment of the invention selected for illustration, the chuck 10 comprises a base plate 12 provided with an opening 14 for the reception of the locating dowel 16 on the lathe carriage 18. This carriage is provided with an annular T-slot 20 in its upper face for the reception of bolt heads 22, the bolts extending through openings in the base plate 12 so that the latter may be clamped to the carriage through tightening of the nuts 24. The groove 20 is arranged concentrically of the dowel 16. A small dowel pin 26 extends loosely through an opening in the base plate 12 for the reception in a bore in the carriage 18 to latch the chuck in its normal position illustrated in the drawings, which dowel pin restrains the chuck from accidental displacement while the nuts 24 are tightened. The carriage 18 may be provided with a series of small openings for the dowel pin 26 spaced at predetermined angular intervals.

The chuck 10 includes an upstanding arm 28. The arm 28 parallels the axis of the dowel 16 and is shaped with a relatively wide body 30 at its lower end. A substantially annular body or plate 32 is spaced from the arm 28. Both the arm 28 and the body 32 are formed integrally with the base plate 12.

The body 32 is provided with a threaded opening 34 for threaded connection with a jam nut 36 having a tool accommodating opening 38. An opening 40 is provided in the body 30 coaxially with the opening 38. These two openings are of the same diameter.

A body 42 is slidably guided in a vertical slot 44 in the arm 28 adjacent its upper end. An adjusting screw 46 is threaded through the body 42 and is rotatably supported in bores 48 in the arm 28. A collar 50 is fixed to the adjusting screw 46 for engagement with the cross portion 52 at the upper end of the slot 44. A wrench receiving nut 54 is formed on the outer end of the screw 46 so that the latter may be rotated to adjust the body 42 vertically. The screw 46 is restrained from endwise movement.

A pin 56 projects laterally from one face of the body 42 for insertion in the piston pinhole in the connecting rod (not shown). Removable bushings may be provided for the pin 56 such as the bushing 58 in Figure 5, to fit pinholes of different sizes to the end that the connecting rod may be hung from the pin in such manner as to accurately space the axis of the piston pinhole from the axis of the boring bar 60.

The boring bar 60 includes a tapered end 62 for insertion in the lathe spindle 64, and a nut 66 is threadedly connected with the small end of the tapered end 62 so that the latter may be clamped firmly in the spindle. Two counterboring tools 68 and 70 are mounted on the boring bar 60. Each tool has an angular edge 72, the two edges facing each other. A roughing tool 74 and a finishing tool 76 are also attached to the boring bar 60. All the tools 68, 70, 76 and 74 have shanks loosely positioned in openings 78 in the boring bar 60 and may be fixedly related to the boring bar by set screws 80. The roughing tool 74 is adjusted to cut a slightly smaller diameter than the finishing tool 76.

Bushings 82 and 84 may be respectively inserted in the bores 38 and 40, these bushings having flanges 86 respectively engageable with the body 30 and the inner end of the jam nut 36. In operation, the connecting rod is hung on the pin 56 and its other bearing end is positioned between the body 30 and the jam nut 36. This bearing end of the connecting rod is clamped firmly to the body 30 through adjustment of the jam nut. The openings 38 and 40 are of sufficiently large diameters to permit the tool of greatest radius to pass easily therethrough. The bushings 82 and 84 are employed to accommodate smaller rods.

Two screws 88 are threaded through the walls 90 interconnecting the bodies 30 and 32. These screws are spaced 180 degrees apart and 90 degrees from the vertical axis of the arm 28. Figure 1 illustrates the connecting rod at 92 as having its crankpin bearing 94 engaged by the two screws 88. The walls 90 are spaced sufficiently far apart to accommodate the bearing 94, which walls are provided with openings 96 constituting exits for chips cut from the bearing.

The connecting rod is held firmly in its adjusted position by reason of the jam nut 36 and the screws 88. The connecting rod may be adjusted laterally through adjustment of the cross feed of the lathe or by the screws 88. Adjustment for length is attained through adjustment of the screw 46. When properly adjusted, the counterboring tools 68 and 70 will hit evenly on the steel of the connecting rod. After the counterboring operation, the automatic feed of the lathe is utilized. As the finishing tool passes through the connecting rod bearing, the automatic feed is cut off and the connecting rod is fed by hand until the other side of the bearing is counterbored. The counterboring is preferably done first by the tool 68 and then by the tool 70 after the tools 74 and 76 have been advanced through the connecting rod bearing.

The screws 88 may be adjusted to position the connecting rod bearing for eccentric boring purposes, as is required in some connecting rods.

The jam nut 38 is provided with grips 98 to facilitate rotation thereof. An extension grip in the nature of a tube 100 may be employed to secure better leverage on the jam nut. Each grip is provided with a threaded shank 102 for threaded connection with the extension grip 100. The arm 28 is provided with a scale 104 coacting with the end 106 of the body 42 for indicating degrees of vertical adjustment of the body. The base plate 12 is also provided with a scale 108 coacting with a mark 110 on the carriage 18 to indicate relative adjustment of the chuck structure 10 about the axis of the dowel 16 in terms of degrees.

Figure 5 illustrates a small milling cutter 112 as being mountable on a small diameter shank 114 at one end of the boring bar 60. This milling tool is made secure by a nut 116, and the tool is of a diameter not greater than the boring bar 60. This tool may be employed for cutting oil pockets in the bearing, as through adjustment of the carriage 18.

Without further elaboration, the foregoing will so fully explain my invention, that others may, by applying current knowledge, readily adapt the same for use under various conditions of service.

I claim:

1. A bearing milling device for connecting rods having first and second bearings at its ends, comprising a rotary tool, a chuck provided with an insert for the first bearing to locate the second bearing in axial alignment with said tool, a jam nut for clamping the second bearing to the chuck, and said chuck provided with tool accommodating openings located on opposite sides of the second bearing supported in the chuck, and means detachably insertable in said openings to comprise fillers engageable with opposite ends of the second bearing to compensate for variable lengths therein.

2. A bearing milling device, comprising a rotary tool, a bearing supporting chuck provided with means for locating the bearing in axial alignment with said tool, means on said chuck for engagement with one end of said bearing; a jam nut for clamping the bearing to said second named means, said chuck including an upstanding arm carrying said first mentioned means, said arm constituting an abutment for one end of said bearing, a body on the chuck spaced from said arm and carrying the jam nut threaded therethrough, said body being spaced from said arm to provide space for the bearing, said arm and said body having aligned openings for the reception of said tool, said first mentioned means being adjustably connected with said arm, and bolts threaded in the chuck for engagement with the sides of the bearing.

JUNIUS P. JOHNSON.